US008705471B2

(12) United States Patent
Zhao et al.

(10) Patent No.: US 8,705,471 B2
(45) Date of Patent: Apr. 22, 2014

(54) METHOD AND SYSTEM FOR IMPLEMENTING ID/LOCATOR MAPPING

(75) Inventors: Ningxia Zhao, Shenzhen (CN); Qiang Wu, Shenzhen (CN); Mingdong Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 128 days.

(21) Appl. No.: 13/257,678

(22) PCT Filed: Apr. 16, 2010

(86) PCT No.: PCT/CN2010/071851
§ 371 (c)(1),
(2), (4) Date: Apr. 23, 2012

(87) PCT Pub. No.: WO2010/145290
PCT Pub. Date: Dec. 23, 2010

(65) Prior Publication Data
US 2012/0207060 A1  Aug. 16, 2012

(30) Foreign Application Priority Data
Nov. 2, 2009  (CN) .......................... 2009 1 0176096

(51) Int. Cl.
*H04W 4/00*  (2009.01)
(52) U.S. Cl.
USPC ....................................................... 370/329
(58) Field of Classification Search
None
See application file for complete search history.

(56) References Cited

U.S. PATENT DOCUMENTS

| 6,247,057 B1 * | 6/2001 | Barrera, III | 709/229 |
| 2004/0128427 A1 * | 7/2004 | Kazar et al. | 711/4 |
| 2006/0230148 A1 * | 10/2006 | Forecast et al. | 709/226 |

FOREIGN PATENT DOCUMENTS

| CN | 1801764 A | 7/2006 |
| CN | 101018238 A | 8/2007 |
| CN | 101335676 A | 12/2008 |
| JP | H1013910 | 1/1998 |
| JP | 2008312191 | 12/2008 |
| KR | 20090065883 A | 6/2009 |

OTHER PUBLICATIONS

Yu, Shi-Peng et al. "Study on the Locator/Identifier Separation" Computer Technology and Development, vol. 19, No. 7, Jul. 2009.
Dave Meyer et al. "Locator/ID Separation Protocol (LISP) Tutorial" IETF Vancouver, Dec. 2007.
Nishida, et al.: "Comparative Evaluation of the IP2 Mobility Management and Mobile IPv6"; The Institute of Electronics, Information and Communication Engineers; Jul. 2004; pp. 31-36.
English Abstract translation of JP2008312191 (Published Dec. 25, 2008).
English Abstract translation of JPH1013910 (Published Jan. 16, 1998).

* cited by examiner

*Primary Examiner* — Raj Jain
(74) *Attorney, Agent, or Firm* — McClure, Qualey & Rodack, LLP

(57) ABSTRACT

A method and a system for implementing an ID-Locator (ID/LOC) mapping are disclosed. The method includes: after allocating a new IP address to User Equipment (UE), the network side sending an ID/LOC mapping request to an ID-LOC-split Mapping Functional Entity (ILM-FE); and the ILM-FE returning a response with mapping information to the network side according to the received ID/LOC mapping request. The method initiates the ID/LOC mapping based on a network in an ID/locator separation in NGN (IPSPLIT) network, which improves the efficiency of the ID/LOC mapping.

4 Claims, 3 Drawing Sheets

METHOD AND SYSTEM FOR IMPLEMENTING ID/LOCATOR MAPPING

CROSS REFERENCE RELATED APPLICATIONS

This application is a national phase of PCT/CN2010/071851 filed Apr. 16, 2010, which claims priority to China Application Serial No. 200910176096.6, filed Nov. 2, 2009, both of which are entirely incorporated herein by reference.

TECHNICAL FIELD

The present invention relates to the field of communication technology, and in particular, to a method and system for implementing ID-Locator (ID/LOC) mapping.

BACKGROUND OF THE RELATED ART

In each layer structure of the current Internet, protocol entities of all layers except for the physical layer have their own name spaces, which are MAC addresses for a link layer, IP addresses for a network layer, IP addresses and port numbers for a transport stratum, and domain names for an application layer respectively. In these name spaces, the MAC address is only required to be unique in a subnet, while the port number is only required to be unique within the host, and therefore, there are two important global name spaces in the Internet, i.e., the IP address and the domain name. The analysis between the domain name and the IP address is implemented through the DNS. In such a name space structure, the IP address has dual functions, i.e., not only functioning as a location identifier of a network interface of a communication terminal host of the network layer in a network topology, but also functioning as an identity identifier of a network interface of the host of the transport stratum. At the beginning of the TCP/IP design, the case that the host moves is not considered, but with the development of the Next Generation Networks (NGN), the problems of user mobility and host multihoming are more and more common, and the defect of semantic overload of this IP address is increasingly evident. When the host's IP address changes, not only the route will change, but also the identity identifier of the communication terminal host will change. The change of the route is acceptable, but the change of a Host Identifier (Host ID) will lead to an interruption in applications and connections.

In order to support mobility and multihoming and better support the continuity of a conversation, the industry proposed an ID/locator separation in NGN (IPSPLIT) technology. The IPSPLIT technology takes a Host ID as an identity identifier of the host, and the Host ID globally and uniquely identifies each host connected to the Internet, and its purpose is to separate the transport stratum and the network layer to provide a secure host mobility and multi-host method for the Internet and provide an encrypted host identity namespace to make it easier to authenticate both communicating parties, thus achieving a secure and trustable network system. In the IPSPLIT network, the IP address only indicates a route location of the communication terminal host in the network topology. This technique solves the problem of semantics overload of the IP address, and separates the dual functions of the IP address, and implements supporting for problems such as multi-mobility, multihoming, IP address dynamic re-allocation, and interacts between different network areas etc.

The IPSPLIT technology is based on the NGN. In the IPSPLIT network, the user can be movable and can also be multihoming. At this time, allocation of IP address to a user is not unique, and one host identifier can correspond to multiple IP addresses, and thus can well solve the problems of multihoming and mobility. The host identity of a multi-homing device corresponds to multiple IP addresses, and if one IP address cannot be used, or there is another IP address more suitable, the established connection for the transport stratum can be easily transferred to another IP address. Due to the moving of the host, the IP address will change, but the Host ID does not change, and therefore, the connection for the transport stratum can be uninterrupted, but the mobile node should notify the change of its own IP address. Since the connection for the transport stratum is bound with the Host ID and the IP address is only used for routing, the IPSPLIT technology enables the interacts between different network areas, such as between the public network and the private network, as well as between the IPv4 network and the IPv6 network etc.

FIG. 1 is a schematic diagram of Ipsplit-based NGN architecture, including network attachment control functions, Id-Loc-Control Functions (ILCF), transport functions, resource and admission control functions, service control functions and end-user functions.

Wherein, the network attachment control functions provide functions such as registration, authentication, authorization, address allocation, parameter configuration, location management etc. for an User Equipment (UE)/user network accessing to the NGN network.

The ILCF stores and dynamically updates the ID/LOC mapping.

The transport Functions complete the transport of information.

The Resource and Admission Control Functions complete admission control, resource reservation etc. when the UE/user network accesses to the network based on a policy and network resource status.

The service control functions belong to a part of the service stratum and complete the registration, authentication, authorization and resource control etc. on the service stratum.

The end-user functions provide users with network access functions.

The functional framework of the NGN system based on the IPSPLIT is shown in FIG. 2, wherein, the functions of various functional entities are as follows.

The Transport User Profile Functional Entity (TUP-FE) is used to store transfer plane related user information.

The Transport Authentication and Authorization Functional Entity (TAA-FE) is used to provide the authentication and authorization functions of the transport stratum, and perform authentication and authorization checking on the user's network access based on the user information.

The Access Management Functional Entity (AM-FE) is used to translate or transform a network access request initiated by the user, and send a request for allocating IP addresses and other network configuration parameters to a Network Access Configuration Functional Entity (NAC-FE).

The NAC-FE is used to be responsible for allocating an IP address to the UE, and meanwhile, possibly allocating other network configuration parameters such as an address of a DNS server, an address of a signaling proxy etc. to the UE.

The Transport Location Management Functional Entity (TLM-FE) is used to register the IP address allocated to the user and other network location information provided by the NAC-FE.

The Id-Loc-split Mapping Function Entity (ILM-FE) functions as a mapping database entity of a user ID-LOC-split system in the NGN, and is used to implement the user identity identifier (Host ID)- to-location (LOC) mapping.

In the existing IPSPLIT network, the ID/LOC mapping is actively initiated by the UE. After acquiring an IP address, the UE actively sends an ID/LOC mapping request to the ILM-FE. After updating its ID/LOC mapping, the ILM-FE returns an ID/LOC mapping response to the UE. The implementation process of the UE actively initiating the ID/LOC mapping is shown in FIG. 3, and comprises the following processes.

A. A process of authentication and authorization.

The UE requests the AM-FE for a network attachment, and the AM-FE completes the process of authentication and authorization of the user through the ILM-FE.

B. A process of IP address configuration.

The process of IP address configuration is consistent with a process of IP address configuration for UE in a general NGN system, and it can be obtained through self-configuration or a Dynamic Host Configuration Protocol (DHCP) mode. The process specifically comprises the following steps.

The UE sends an address request to the NAC-FE through the DHCP;

the NAC-FE pushes binding information to the TLM-FE, wherein, the binding message comprises a temporal address allocated by the NAC-FE and other information such as logical and physical port address translation related information; and the TLM-FE pushes policy information to the RACF, and meanwhile, sends the binding information with the address to the NAC-FE, and the NAC-FE allocates a new IP address to the UE.

C. A process of ID/LOC mapping.

C.1. The UE sends an ID/LOC mapping request to the ILM-FE; and

C.2. After updating the ID/LOC mapping, the ILM-FE returns an ID/LOC mapping response to the UE.

D. A process of transport location management.

The SCF interacts with the ILM-FE to achieve the transport location management.

In existing ipsplit-based networks, the ID/LOC mapping is actively initiated by the UE. Although the UE actively initiating the ID/LOC mapping can achieve the ipsplit technology, in the network-based ipsplit technology, the UE actively initiating the ID/LOC mapping makes the efficiency be not very high.

SUMMARY OF THE INVENTION

The technical problem to be solved by the present invention is to provide a method and system for implementing ID/LOC mapping, which improves the efficiency of the ID/LOC mapping and better adapts to features of the network-based IPSPLIT.

In order to solve the aforementioned technical problem, the present invention provides a method for implementing an ID/LOC mapping, comprising:

after allocating a new IP address to UE, a network side sending an ID/LOC mapping request to an ILM-FE; and the ILM-FE returning a response carrying mapping information to the network side according to the received ID/LOC mapping request.

Preferably, the network side is a NAC-FE; and the ID/LOC mapping request carries the new IP address and an UE identity identifier.

Preferably, in the step of the network side allocating a new IP address to the UE, after receiving a DHCP request sent by the UE through an AM-FE, the NAC-FE allocates a new IP address to the UE.

Preferably, in the step of the network side allocating a new IP address to the UE, after receiving a configuration request sent by the AM-FE, the NAC-FE allocates a new IP address to the UE.

In order to solve the aforementioned technical problem, the present invention provides a system for implementing an ID/LOC mapping, comprising a network side and an ILM-FE, wherein, the network side is configured to send an ID/LOC mapping request to the ILM-FE after allocating a new IP address to UE; and the ILM-FE is configured to return a response carrying mapping information to the network side according to the received ID/LOC mapping request.

Preferably, the network side is a NAC-FE, and the NAC-FE is configured to carry the new IP address and an UE identity identifier in the ID/LOC mapping request that is sent to the ILM-FE.

Preferably, the NAC-FE is further configured to allocate a new IP address to the UE after receiving a DHCP request sent by the UE through an AM-FE.

Preferably, the NAC-FE is further configured to allocate a new IP address to the UE after receiving the configuration request sent by the AM-FE.

In order to solve the aforementioned technical problem, the present invention provides an apparatus for supporting an ID/LOC mapping, which is applied in a network side, comprising an allocating module, a transmitting module and a receiving module, wherein, the allocating module is configured to allocate a new IP address to UE;

the transmitting module is configured to send an ID/LOC mapping request to an ILM-FE after the allocating module allocates a new IP address to the UE; and the receiving module is configured to receive a response carrying mapping information returned by the ILM-FE.

Preferably, the apparatus is a NAC-FE.

Preferably, the transmitting module is further configured to carry the new IP address and an UE identity identifier in the ID/LOC mapping request that is sent to the ILM-FE.

Preferably, the transmitting module is further configured to allocate a new IP address to the UE after receiving a DHCP request sent by the UE through the AM-FE.

Preferably, the transmitting module is configured to allocate a new IP address to the UE after receiving the configuration request sent by the AM-FE.

After the present invention is applied, initiating the ID/LOC mapping based on a network in the IPSPLIT network can be achieved, which improves the efficiency of the ID/LOC mapping.

PREFERRED EMBODIMENTS OF THE PRESENT INVENTION

To make purposes, technical solutions and advantages of the present invention more clear, the present invention will be described in further detail hereinafter by way of examples and in conjunction with accompanying drawings.

The core idea of the present invention is that: in an IPSPLIT-based NGN, after acquiring a new IP address allocated to UE, the network side sends an ID/LOC mapping request to an ILM-FE. After receiving the ID/LOC mapping request, the ILM-FE updates the mapping, and returns an ID/LOC mapping response carrying mapping information to the network side.

Embodiment One

Figure 1:
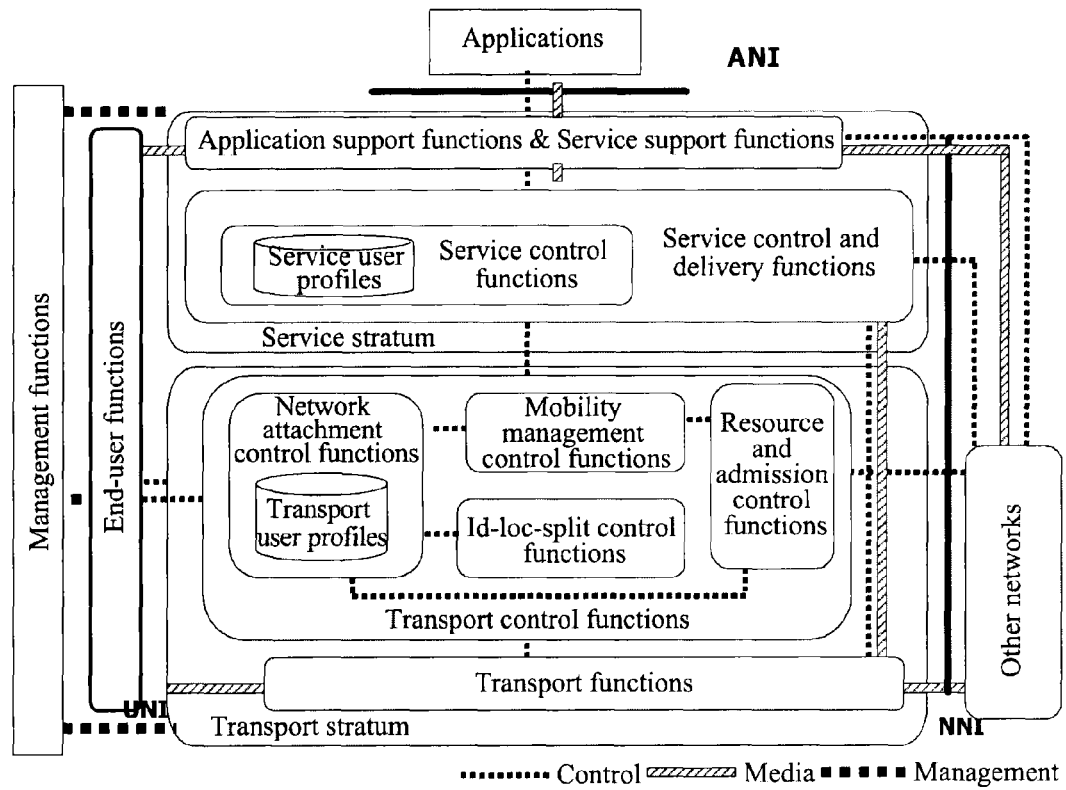
FIG. 1 is a schematic diagram of Ipsplit-based NGN architecture.
Figure 2:
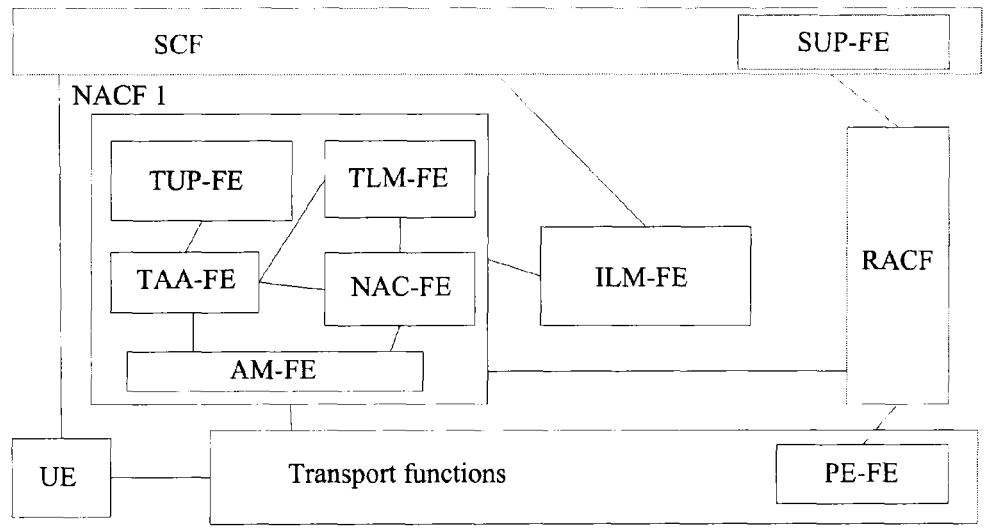
FIG. 2 is a schematic diagram of a functional framework of Ipsplit-based NGN architecture.
Figure 3:
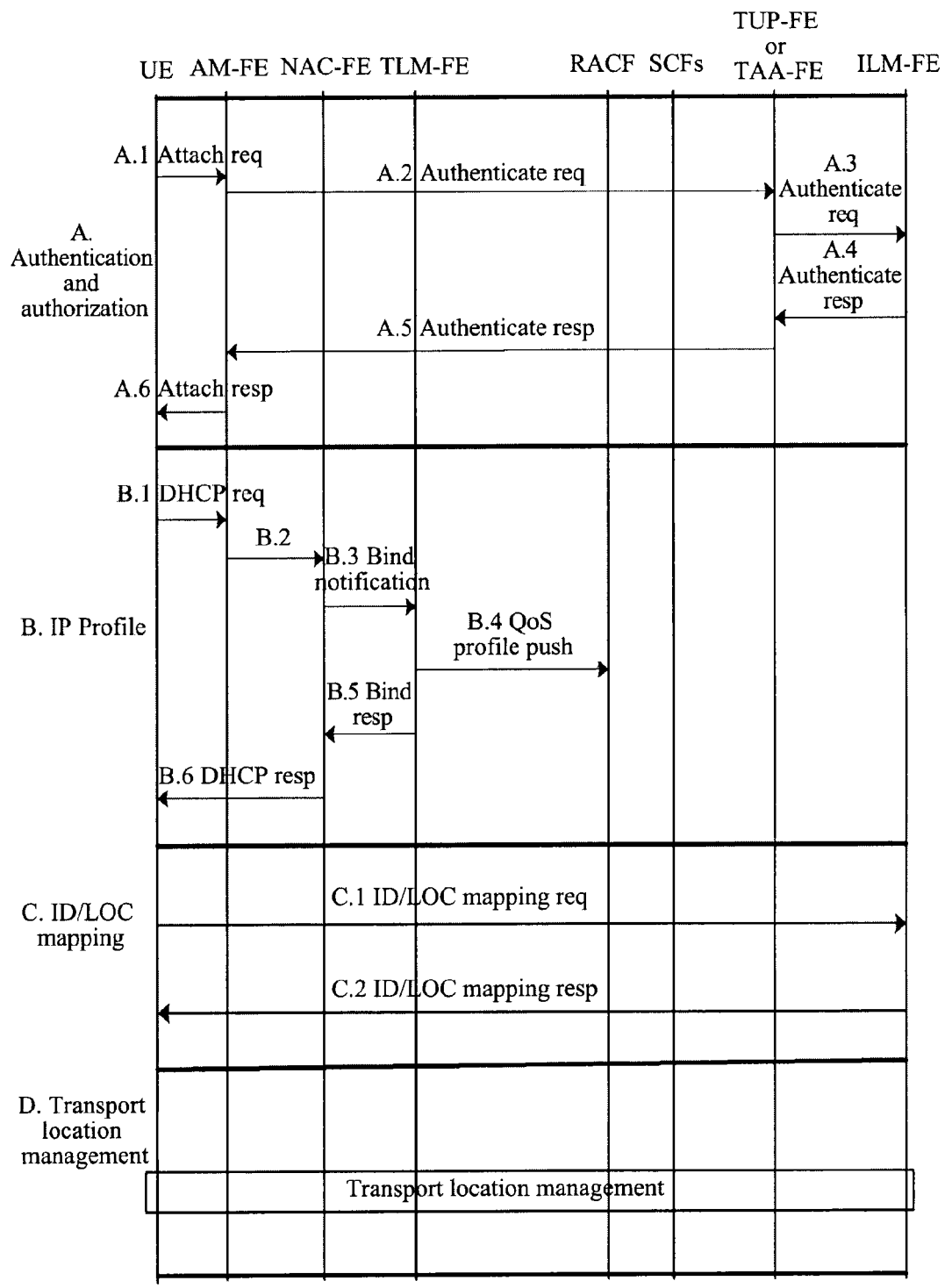
FIG. 3 is a schematic diagram of a process of an existing UE initiating a ID/LOC mapping.
Figure 4:
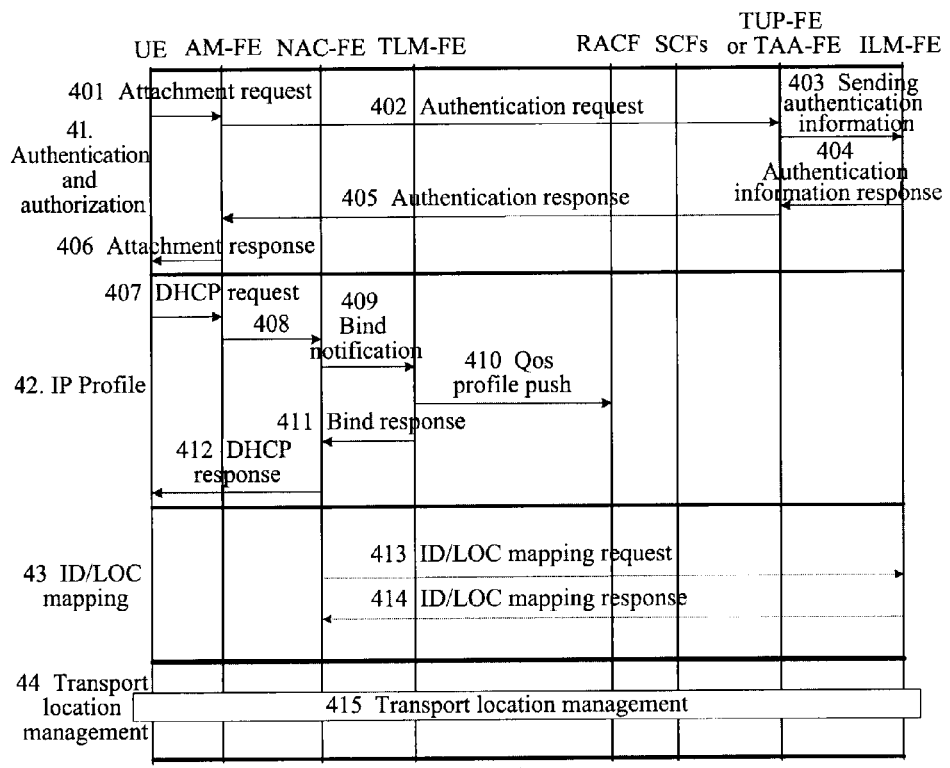
FIG. 4 is a diagram of a process of a network initiating an ID/LOC mapping according to the present invention (acquiring an IP address by means of the DHCP)

A mode for UE obtaining an IP address in an IPSPLIT-based NGN network can be a DHCP mode or a PPP mode. An implementation method for acquiring an IP address using the DHCP mode in an IPSPLIT network and initiating an ID/LOC mapping based on a network is shown in FIG. 4, which comprises the following steps.

In Step 41, it is a process of authentication and authorization.

The UE requests an AM-FE for a network attachment, and the AM-FE completes the process of the user's authentication and authorization through an ILM-FE.

In Step 42, it is a process of IP address configuration.

The process of IP address configuration is consistent with a process of IP address configuration of UE in a general NGN system, and it can be obtained through self-configuration or a DHCP mode. The process specifically comprises the following steps.

In Step 407, the UE sends a DHCP request to the AM-FE.

In Step 408, the AM-FE sends the DHCP request to the NAC-FE.

In Step 409, after receiving the DHCP address request, the NAC-FE allocates an IP address to the UE, and binds the IP address with a Logical Connection Identifier (Line ID), and the NAC-FE pushes binding information to the TLM-FE, wherein, the binding information comprises a temporal address allocated by the NAC-FE and other information such as logical and physical port address translation related information.

In Step 410, the TLM-FE pushes policy information to a RACF.

In Step 411, the TLM-FE returns a binding response to the NAC-FE, wherein, the binding response indicates whether the binding is successful or not.

Wherein, Steps 410 and 411 have no order relationship.

In Step 412, the NAC-FE allocates a new IP address to the UE.

In Step 43, it is a process of ID/LOC mapping, which comprises the following steps.

In Step 413, the NAC-FE sends an ID/LOC mapping request to the ILM-FE.

Wherein, the Step 413 is performed after the NAC-FE receives the DHCP address request and allocates the IP address.

In Step 414, the ILM-FE updates the ID/LOC mapping and returns an ID/LOC mapping response carrying mapping information to the NAC-FE.

In Step 44, it is a process of transport location management.

In Step 415, a SCF interacts with the ILM-FE to achieve the transport location management.

Embodiment Two

Figure 5:
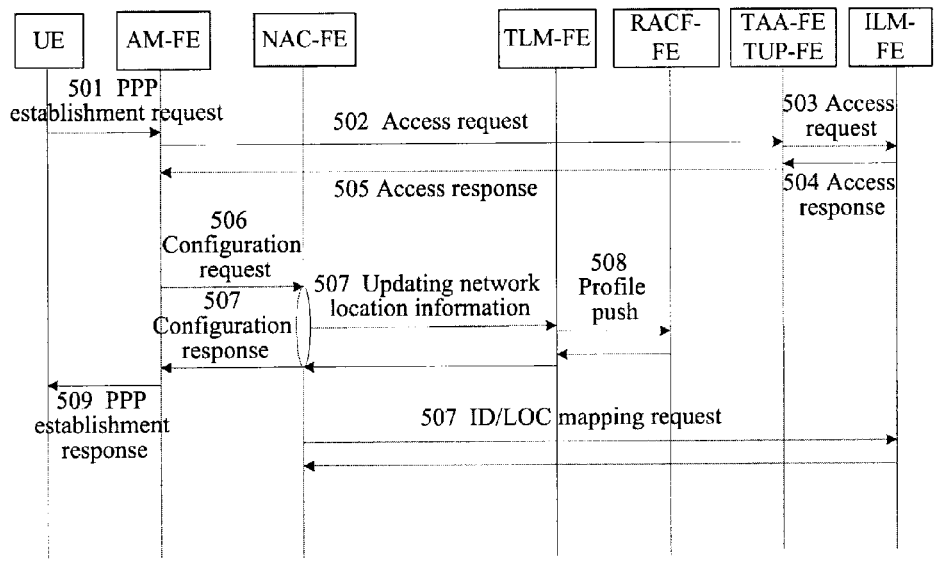
FIG. 5 is a diagram of a process of a network initiating an ID/LOC mapping according to the present invention (acquiring an IP address by means of the PPP).

An implementation method for acquiring an IP address using the PPP mode in an IPSPLIT network and initiating an ID/LOC mapping based on a network is shown in FIG. 5, which comprises the following steps.

In 501, the UE sends a PPP establishment request to an AM-FE.

In 502, after receiving the PPP establishment request, the AM-FE sends an access request to a TAA-FE.

In 503, the TAA-FE sends the access request to an ILM-FE.

In 504, after receiving the access request, the ILM-FE authenticates and authorizes the request and returns an access response carrying authentication and authorization information to the TAA-FE.

In 505, the TAA-FE returns the access response to the AM-FE.

In 506, the AM-FE sends a configuration request to a NAC-FE to obtain the IP address and other information.

In 507, the NAC-FE acquires the IP address and responds the AM-FE, and meanwhile, the NAC-FE also sends the acquired IP address and its binding information to the TLM-FE, and at the same time, the NAC-FE also sends an ID/LOC mapping request to the ILM-FE, and after receiving the ID/LOC mapping request, the ILM-FE binds the ID/LOC with the related information thereof, and then the ILM-FE returns a mapping response carrying mapping information to the NAC-FE.

In 508, the ILM-FE pushes the acquired binding information to the RACF.

In 509, the AM-FE sends a PPP response including the allocated IP address and other information to the UE.

The present invention further provides a system for implementing an ID/LOC mapping, and the system comprises a network side and an ILM-FE, wherein, the network side is configured to send an ID/LOC mapping request to the ILM-FE after allocating a new IP address to UE; and the ILM-FE is configured to return a response carrying mapping information to the network side after receiving the ID/LOC mapping request.

Wherein, the network side is a NAC-FE, and the NAC-FE is configured to carry the new IP address and an UE identity identifier in the ID/LOC mapping request.

Wherein, the NAC-FE is further configured to allocate a new IP address to the UE after receiving a DHCP request sent by the UE through an AM-FE; or, allocate a new IP address to the UE after receiving a configuration request sent by the AM-FE.

An apparatus for supporting an ID/LOC mapping in accordance with an embodiment of the present invention is applied at a network side, and the apparatus comprises an allocating module, a transmitting module and a receiving module.

Wherein, the allocating module is configured to allocate a new IP address to UE.

The transmitting module is configured to send an ID/LOC mapping request to an ILM-FE after the allocating module allocates a new IP address to the UE.

The receiving module is configured to receive a response carrying mapping information returned by the ILM-FE.

The apparatus can be a NAC-FE.

The transmitting module is further configured to carry the new IP address and an UE identity identifier in the ID/LOC mapping request that is sent to the ILM-FE.

The transmitting module is further configured to allocate a new IP address to the UE after receiving a DHCP request sent by the UE through an AM-FE.

The transmitting module is configured to allocate a new IP address to the UE after receiving the configuration request sent by the AM-FE.

In the present invention, the network side actively sends the ID/LOC mapping to the ILM-FE after the network side allocates a new IP address to the UE, and compared with sending the ID/LOC mapping to the ILM-FE by the UE after the network side allocates a new IP address to the UE in the related art, the efficiency of updating the ID/LOC mapping is faster.

Although the present invention is described in conjunction with the specific embodiments, for those skilled in the art, modifications and changes can be made without departing from the spirit or scope of the present invention. All these modifications and changes should be considered within the scope of the present invention and the scope of the appended claims.

INDUSTRIAL APPLICABILITY

The present invention provides a method and system for implementing an ID/LOC mapping, in which the network side actively sends the ID/LOC mapping to the ILM-FE after the network side allocates a new IP address to the UE, and compared with sending the ID/LOC mapping to the ILM-FE by the UE after the network side allocates a new IP address to the UE in the related art, the efficiency of updating the ID/LOC mapping is faster.

What is claimed is:

1. A method for implementing an ID-locator mapping, comprising:
    after allocating a new IP address to a User Equipment (UE), a network side sending an ID-locator (ID/LOC) mapping request to an ID-Loc-split mapping function entity (ILM-FE); and
    the ILM-FE returning a response carrying mapping information to the network side according to the received ID/LOC mapping request;
    wherein, the network side is a Network Access Configuration Functional Entity (NAC-FE); and the ID/LOC mapping request carries the new IP address and an UE identity identifier; and
    wherein in the step of the network side allocating a new IP address to the UE, after receiving a configuration request sent by the AM-FE, the NAC-FE allocates the new IP address to the UE.

2. A system for implementing an ID-Locator mapping, comprising a network side and an Id-Loc-split Mapping Function Entity (ILM-FE), wherein,
    the network side is configured to send an ID-Locator (ID/LOC) mapping request to the ILM-FE after allocating a new IP address to an User Equipment (UE);
    the ILM-FE is configured to return a response carrying mapping information to the network side according to the received ID/LOC mapping request;
    wherein, the network side is a Network Access Configuration Functional Entity (NAC-FE), and the NAC-FE is configured to carry the new IP address and an UE identity identifier in the ID/LOC mapping request that is sent to the ILM-FE; and
    wherein the NAC-FE is further configured to allocate the new IP address to the UE after receiving a configuration request sent by the AM-FE.

3. An apparatus for supporting an ID-Locator mapping, which is applied in a network side, the apparatus comprising an allocating module, a transmitting module and a receiving module, wherein,
    the allocating module is configured to allocate a new IP address to an User Equipment (UE);
    the transmitting module is configured to send an ID-Locator (ID/LOC) mapping request to an Id-Loc-split Mapping Function Entity (ILM-FE) after the allocating module allocates a new IP address to the UE;
    the receiving module is configured to receive a response carrying mapping information returned by the ILM-FE;
    wherein, the transmitting module is further configured to carry the new IP address and an UE identity identifier in the ID/LOC mapping request that is sent to the ILM-FE; and
    wherein, the transmitting module is further configured to allocate the new IP address to the UE after receiving a configuration request sent by the AM-FE.

4. The apparatus of claim 3, wherein,
    the apparatus is a Network Access Configuration Functional Entity (NAC-FE).

* * * * *